May 13, 1969    W. J. LAVIGNE, JR., ET AL    3,443,572
PRESSURE RELIEF DEVICE
Filed June 26, 1967
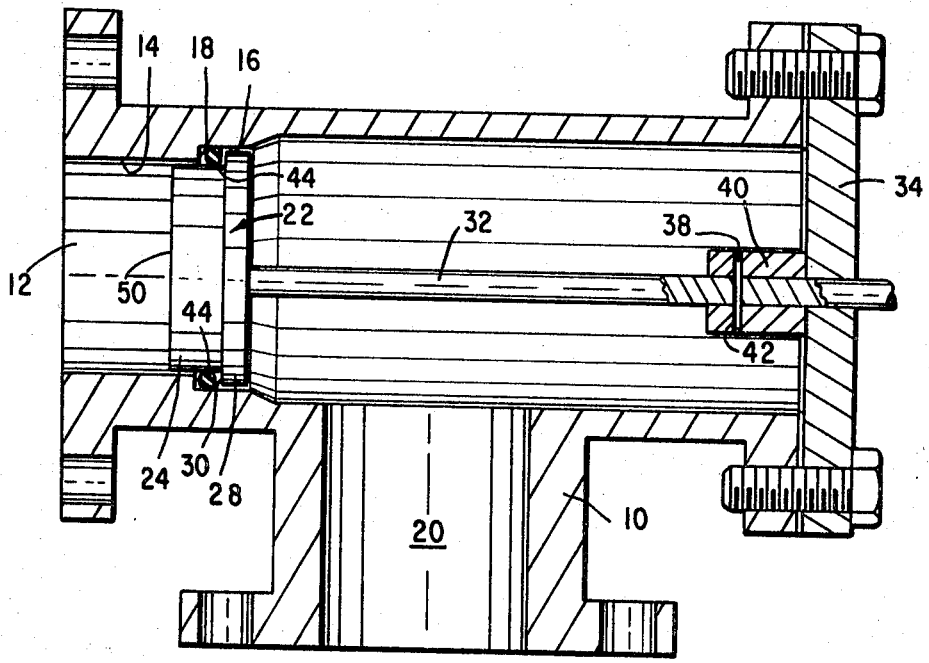
INVENTORS.
WILLIAM J. LAVIGNE, JR.
WILLIAM T. OSBORNE.
CARL M. ANDERSON.
BY
ATTORNEY.

United States Patent Office 3,443,572
Patented May 13, 1969

3,443,572
PRESSURE RELIEF DEVICE
William J. Lavigne, Jr., Fayetteville, William T. Osborne, East Syracuse, William M. Anderson, Syracuse, N.Y., assignors to Carrier Corporation, Syracuse, N.Y., a corporation of Delaware
Filed June 26, 1967, Ser. No. 648,699
Int. Cl. F16k 17/14
U.S. Cl. 137—70
1 Claim

ABSTRACT OF THE DISCLOSURE

A pressure relief device for use in place of rupture discs or conventional relief valves incorporating a piston slidable in a passageway subject to high pressure fluid. A seal between the piston and the wall of the passageway is provided by inserting an O-ring in a space between a shoulder formed in the passageway and a shoulder formed in the piston. This arrangement reduces the force involved in overcoming the friction represented by the seal by providing space enabling the piston and seal to roll relative one to the other when excessive pressure is encountered.

Background of the invention

In certain systems involving sealed fluid under pressure such as refrigeration machines, it is necessary in the interest of safety to provide a pressure relief device. In the past, it has been suggested that rupture discs be provided. The discs are constructed so as to rupture when subjected to pressures in excess of that considered safe operating pressure. One of the problems involved with rupture discs is that the discs have poor resistance to fatigue particularly when the normal operating pressure is very near the preset relief pressure. In refrigeration machinery, for example, the system pressure tends to vary within certain limits causing the rupture disc to be subjected to a wide fluctuation of pressure. Eventually, a rupture disc may be weakened as it flexes under the varying pressure conditions. Where a very large relief opening is required under certain conditions of pressure and sealed fluid characteristics, conventional relief valves are unsatisfactory from the standpoints of accuracy and leak tightness.

It is an object of this invention to provide a pressure relief device for use with systems of the kind described wherein a piston subject to the system pressure is arranged so as to move out of a sealing position when forces in excess of those considered safe are encountered.

Summary of the invention

A pressure relief device comprising a body member in the form of a T is provided with a first passageway subject to the pressure being measured. A piston member is slidable in the passageway. The piston member is provided with a first section of relatively large diameter and a second section having a smaller diameter. The passageway is also provided with sections of different diameter so that complementary shoulders on the piston and the wall of the body member defining the passageway may provide a multi-surface seal accommodating chamber. Interposed within the chamber, formed as the shoulder on the piston is axially spaced from the shoulder on the body wall of the passageway, is an O-ring which forms a seal to prevent the escape of high pressure fluid from the machine during normal operating conditions. The body member is provided with an opening serving as an outlet to a receiver or to the atmosphere. The piston is maintained in the passageway by forcing the piston downwardly in the passageway compressing the O-ring therebetween. A stem extends from the piston and has means applied to the opposite end thereof to assure maintenance of the piston within the passageway until the pressure in excess of a predetermined value is encountered.

In its operating position, the piston prevents communication between the passageway serving as the inlet and the opening in the body member serving as an outlet.

Description of the drawings

The figure is an elevational view partly in section illustrating a pressure relief device constructed in accordance with the invention.

Description of the preferred embodiment

Referring more particularly to the drawing, there is shown a pressure relief device for use with refrigeration machines employing low pressure refrigerants. The pressure relief device includes a body member 10 generally formed in the shape of a T. A first passageway 12 communicates with the interior of a vessel or machine containing the fluid under pressure. Passageway 12 includes a first portion 14 of relatively small diameter and a second portion 16 of larger diameter so as to form therewith shoulder 18. Passageway 12 extends through to the other side of the body and in addition includes a branch passageway 20 serving as an outlet. The branch passageway 20 may be connected to the atmosphere or to a receiver for receiving refrigerant that may escape from the machine to which the pressure relief device is attached.

Arranged within passageway 12 is a piston 22 having a first section 24 of reduced diameter and a second section 28 of somewhat greater diameter, the two sections forming a shoulder 30 arranged to confront shoulder 18 in passageway 12.

Extending upwardly from the piston is a stem 32 passing through a cover 34. Prior to projecting beyond the cover member 34, the stem 32 passes through a block 40. Corresponding passageway 42 is formed in block 40 for the purpose of enabling pin 38 to extend through the block as well as the stem.

In order to provide a seal between the piston and cylindrical passageway 12, there is provided an O-ring 44 disposed within a space formed when the piston is maintained in spaced relation to the shoulder 18 of the passageway.

Considering the operation of the pressure relief device, the parts are assembled in the manner shown and the body connected to a machine such as a refrigeration machine so that the face 50 of the piston will be subject to the pressure within the machine. The parts are constructed so that pressure in excess of a predetermined magnitude will cause the piston to move upwardly in the body member. The shear pin will fail in shear at the predetermined pressure. Heretofore, it has been difficult when conventional O-ring seals have been employed with the piston and cylindrical passageway to obtain the sensitivity desired. For example, when the O-ring is assembled within an annular groove in a constant diameter piston, considerable friction is involved in moving the piston upwardly in the passageway. The friction may vary because of the swelling of the O-ring or because of a failure to observe tolerances as far as the parts are concerned.

With the arrangement illustrated wherein the piston and passageway wall are provided with shoulders, the O-ring is permitted to "roll" relative to the piston surface so that the friction involved in moving the piston is less than that encountered in the more conventional construction described above. It is, therefore, easier to design pressure relief devices having relatively constant rupture or release values.

While we have described a preferred embodiment of the invention, it is to be understood the invention is not limited thereto, but may be otherwise embodied within the scope of the following claims.

We claim:

1. A pressure relief device for use in a refrigeration system, comprising a body member having a passage of differential diameter which provides a ledge portion intermediate the length thereof communicating with a source of high pressure fluid located upstream of said passage, a piston having a relatively large diameter section and a lesser diameter section defining therebetween a shoulder portion, said piston being slidably disposed in the passage and positioned therein so that said shoulder and ledge portions are in close adjacency when said piston is in a closed position, means defining a tapered surface intermediate the length of the passage in close proximity to the relatively large diameter section of the piston when said piston is in a closed position, said tapered surface being effective to properly position said piston within said passage, an annular sealing member interposed between the piston and body wall so as to engage the shoulder and ledge portions as well as the body wall forming the passage and relatively lesser diameter section of the piston, said annular sealing member being positioned, relative to said inner body wall and said lesser diameter section of the piston, so that when the piston is caused to move due to excessive fluid pressure, said sealing member will roll axially relative to the surface of said lesser diameter section of the piston, said tapered surface preventing said sealing member from being radially crushed between said piston and said cylinder surfaces, means forming a body member outlet located downstream of the tapered surface, and means operable in the absence of fluid pressure exceeding a predetermined magnitude for maintaining the piston in sealing engagement with the passage.

References Cited

UNITED STATES PATENTS

| | | | |
|---|---|---|---|
| 771,486 | 10/1904 | McCarthy | 251—210 |
| 2,304,491 | 12/1942 | Allen | 137—70 X |
| 3,051,196 | 8/1962 | Miller | 137—516.29 |

CARROLL B. DORITY, Jr., *Primary Examiner.*

U.S. Cl. X.R.

137—516.29